United States Patent [19]

Mitchem et al.

[11] 4,196,047
[45] Apr. 1, 1980

[54] IRRADIATION SURVEILLANCE SPECIMEN ASSEMBLY

[75] Inventors: Jerry W. Mitchem, Bedford; David D. Kalen, Lynchburg; Francis C. Klahn, Madison Heights, all of Va.

[73] Assignee: The Babcock & Wilcox Company, New Orleans, La.

[21] Appl. No.: 878,955

[22] Filed: Feb. 17, 1978

[51] Int. Cl.² ............................................. G21G 1/00
[52] U.S. Cl. ........................................ 176/15; 176/74; 176/77
[58] Field of Search ............................... 176/15, 77, 74

[56] References Cited

U.S. PATENT DOCUMENTS

| | | | |
|---|---|---|---|
| 3,189,525 | 6/1965 | Davis | 176/77 |
| 3,294,642 | 12/1966 | Recule et al. | 176/15 |
| 3,773,615 | 11/1973 | Blatter | 176/15 |

Primary Examiner—Harvey E. Behrend
Attorney, Agent, or Firm—Robert J. Edwards; Robert H. Kelly

[57] ABSTRACT

A surveillance assembly within a nuclear reactor contains representative reactor material specimens which are to be irradiated. The material specimens are contained within sealed capsules that are stacked end to end within a holder tube. Each capsule is designed with shaped end fittings which intermesh with the adjacent end of an abutting capsule, holder tube end plug or holder tube closure device. The capsules are restrained by axial loading imparted by the closure device. The holder tube is orthotropically supported within the reactor.

7 Claims, 14 Drawing Figures

IRRADIATION SURVEILLANCE SPECIMEN ASSEMBLY

BACKGROUND OF THE INVENTION

This invention relates to nuclear reactors and, more particularly, to material surveillance assemblies for monitoring changes in reactor material properties resulting from exposure to neutron irradiation and the thermal environment within the reactor.

Reactor vessel material surveillance programs are designed to monitor the radiation and temperature induced changes occurring in the mechanical properties of a vessel throughout its operating life. Typically, test specimens are prepared from the actual materials used in fabricating the irradiated region of the reactor vessel. The irradiated region, known as the core beltline, is defined as that region which directly surrounds the effective height of the fuel element assemblies. Material specimens include metal from one heat of the base metal used in the irradiated zone, weld metal fully representative of the fabrication practice used for welds in the irradiated region, and weld heat-affected zone metal.

The surveillance specimens are generally loaded into specimen containing capsules which, in turn, are assembled in holder assemblies inside the reactor vessel within the beltline region. The surveillance capsules are located near the inside vessel wall so as to receive a neutron and thermal exposure that is representative of the exposures of the reactor vessel being monitored in order to duplicate, as closely as possible, the neutron-flux spectrum, temperature history, and maximum accumulated neutron fluence of the vessel.

Design and location of the holder assemblies and surveillance capsules must permit removal of the capsules and insertion of replacement capsules. In accordance with a predetermined schedule, selected surveillance capsules are periodically withdrawn from the reactor vessel and the material specimens tested to ascertain changes in the fracture toughness properties of the materials.

The holder assemblies and surveillance capsules must be designed to facilitate withdrawal of the surveillance capsules and insertion of replacement capsules. The holder assemblies, in addition, must adequately restrain the capsules to preclude damage to or failure of the capsules due to coolant pressure and flow under both steady state and transient conditions.

In some surveillance specimen assembly designs, the specimen capsules have been longitudinally stacked and housed in vertically oriented, hollow elongated containers or holders. These elongated containers have generally been much longer than the total length of the capsules, and include an upper portion oriented above the beltline region to facilitate transfer of the capsules during insertion and removal operations. The capsules, of course, have been located in portions of the holders within the beltline region. Hence, the longitudinal restraints have often taken the form of elongated bars, and the like, which traverse the distance from the top of the container to the uppermost capsule and, through spring loading, longitudinally restrain the capsules. Lateral clearances are required to permit capsule insertion and removal. Hence, in some previous designs, lateral restraint of the capsules has been omitted. In other designs lateral restraint of the capsules has been effected by limited contact of the capsules with the container wall. There are a number of inherent disadvantages to such arrangements. The spring loaded elongated longitudinal restraints have often been found to be subject to vibratory loadings that result in wear and eventual failure of the surveillance specimen assembly, particularly where lateral restraints are omitted or the capsules are subjected to hydraulic conditions which are conducive to inducing vibration.

Temperature differences, due to variations in flow conditions and gamma heating, between the surveillance specimen assemblies and the adjacent reactor structure to which the container is attached have, in addition, resulted in a need for interconnections which can accommodate differential thermal gradients without transmitting corresponding stress deformations to the container. However, the holder assembly and its support system must also be designed to withstand and minimize destructive vibrational excitations that may be either hydraulically or mechanically induced.

SUMMARY OF THE INVENTION

The problems and disadvantages discussed above are effectively surmounted by the practice of the invention.

A surveillance specimen assembly for housing and supporting irradiation specimen capsules within a nuclear reactor is presented. An elongated holder tube houses a number of elongated surveillance specimen capsules which are stacked end to end within the holder tube. The opposite ends of the surveillance specimen capsules alternatively contain end fittings including either a V-shaped recess or a V-shaped projection. The capsules are oriented such that the end fittings of adjacent end fittings mesh. An end plug and closure mechanism, located at the opposite ends of the holder tube, are also shaped to intermesh with the adjacent ends of the bordering specimen capsules. The closure mechanism may be axially loaded so as to place the specimen capsules in compression and the holder tube in tension. The reaction of the intermeshed V-shaped recesses and projections under the axial loading results in support and restraint of the specimen capsule. The holder tube is perforated to permit reactor coolant to flow about the capsules. The holder tube is connected to the reactor by an integral rigid support located approximately at its midcenter and by integral supports, which are comparatively flexible in the plane of the longitudinal axis of the holder tube, integrally formed near the end portions of the holder tube. Hence, the invention provides means for supporting and restraining the holder tube and capsules containing surveillance specimens in a representative thermal and radiation environment.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENTS

Figure 1:
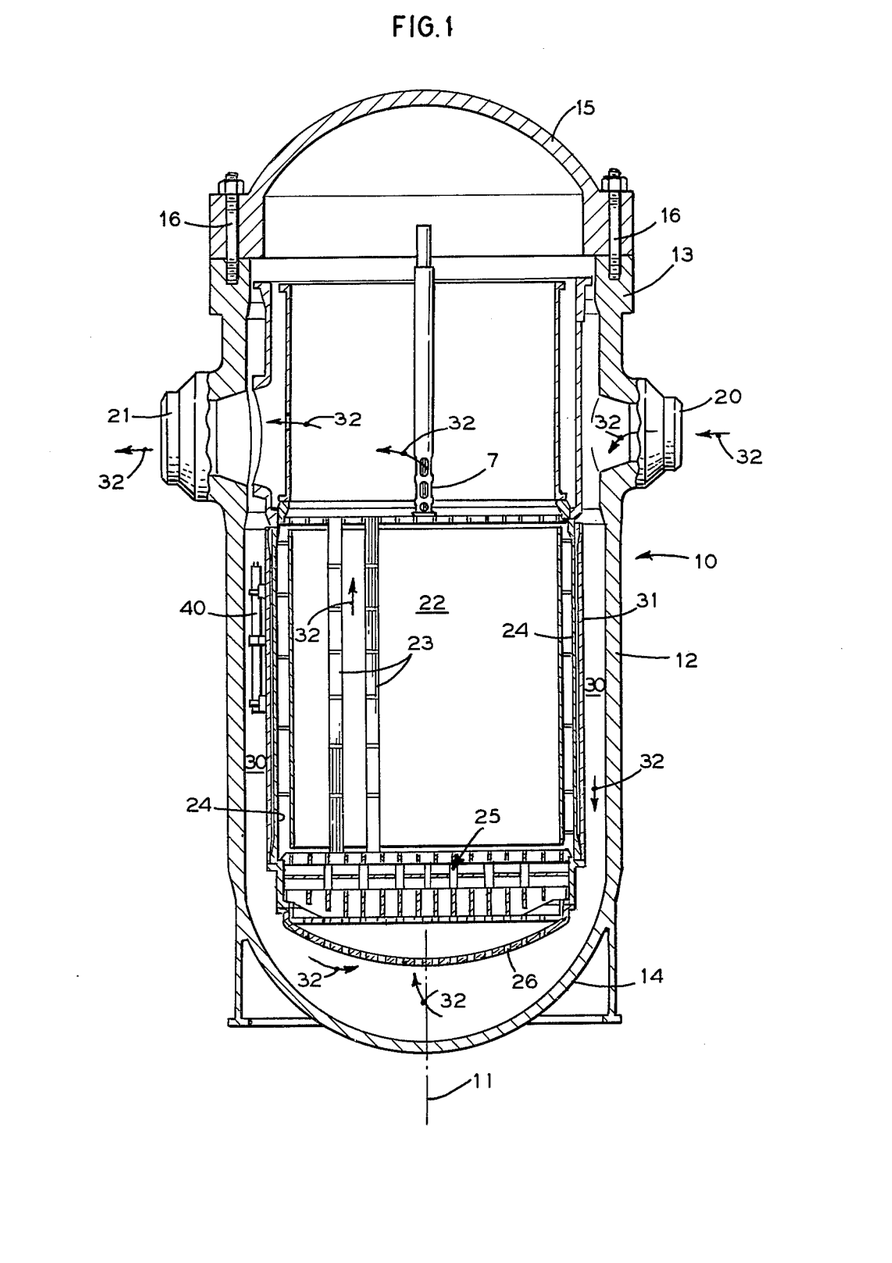
FIG. 1 is a schematic cross section of a nuclear reactor.

A schematic cross section of some of the components in a typical nuclear reactor is illustrated in FIG. 1.

In FIG. 1, a nuclear reactor pressure vessel 10 is disposed with its longitudinal axis 11 in a vertical plane. The pressure vessel 10 has a right cylindrical shell 12 which in the illustrated embodiment has an integral shell flange 13 at its upper end, and is closed at its lower end by an integral spherically-dished end closure 14. A flanged upper closure head assembly 15, also spherically-dished, is attached to the cylindrical shell 12 by a plurality of studs 16 which penetrate the flange of the closure head 15 and are received in and secured to the integral shell flange 13. Inlet nozzles 20 and outlet nozzles 21, only one each of which is shown, respectively receive coolant from a reactor coolant system (not shown) and discharge the heated fluid back into the reactor coolant system.

The reactor pressure vessel 10 houses and supports the reactor core 22 which is composed of an array of vertical fuel element assemblies 23 that contain multiple fuel elements. The fuel element assemblies 23 are mechanically interchangeable. A hollow cylinder 24 known as the core barrel, circumscribes the reactor core and supports the fuel assemblies 23, a lower grid assembly 25 on which the fuel assemblies rest, and a lower flow distributor 26. The core barrel 24 is radially spaced from part of the inside surface of the shell 12 forming an annulus 30. The lower grid assembly 25 is a series of grid structures transversely disposed with respect to the reactor's longitudinal center line 11 and to the lower end of the core barrel 24. The lower grid assembly provides alignment and support for the fuel assemblies 23. The lower flow distributor 26 is a perforated dished plate oriented horizontally below and attached to the core barrel 24. A cylindrical thermal shield 31 installed in the annulus 30 between the core barrel 24 and the inner wall of the reactor vessel. The thermal shield 31 is supported by the lower grid assembly 25.

The inlet nozzles 20 provide means for the passage of a reactor coolant fluid into the reactor. The arrows 32 show the general flow path that the coolant takes through the reactor. The reactor coolant flows downwardly through the annulus 30 to the lower flow distributor 26 which distributes the coolant to the core 22. The coolant traverses the length of the fuel elements from which heat is transferred and the coolant is discharged via outlet nozzles 21 to the reactor coolant loops.

Figure 2:
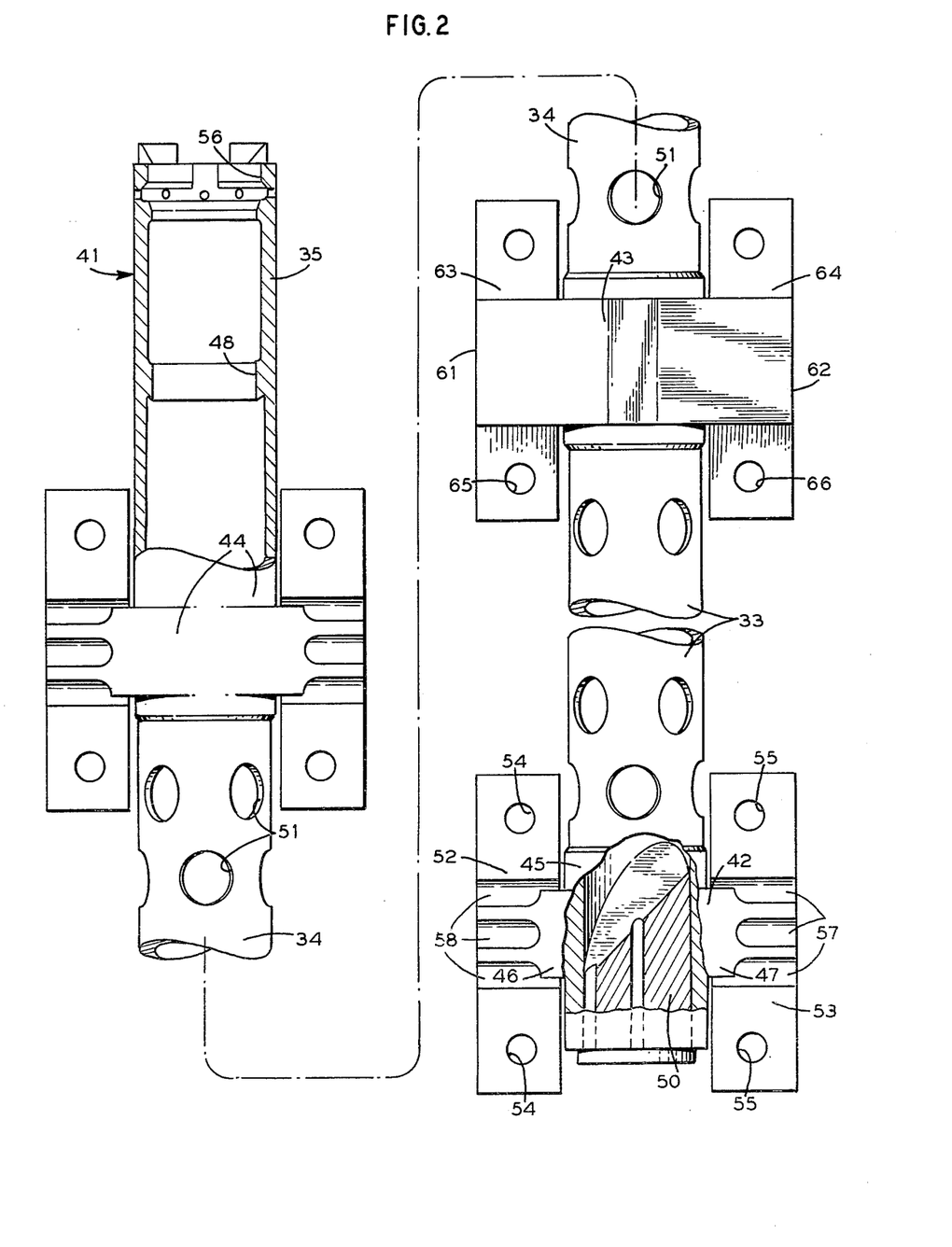
FIG. 2 is an elevation view, partly broken away, of a surveillance specimen holder tube.
Figure 3:
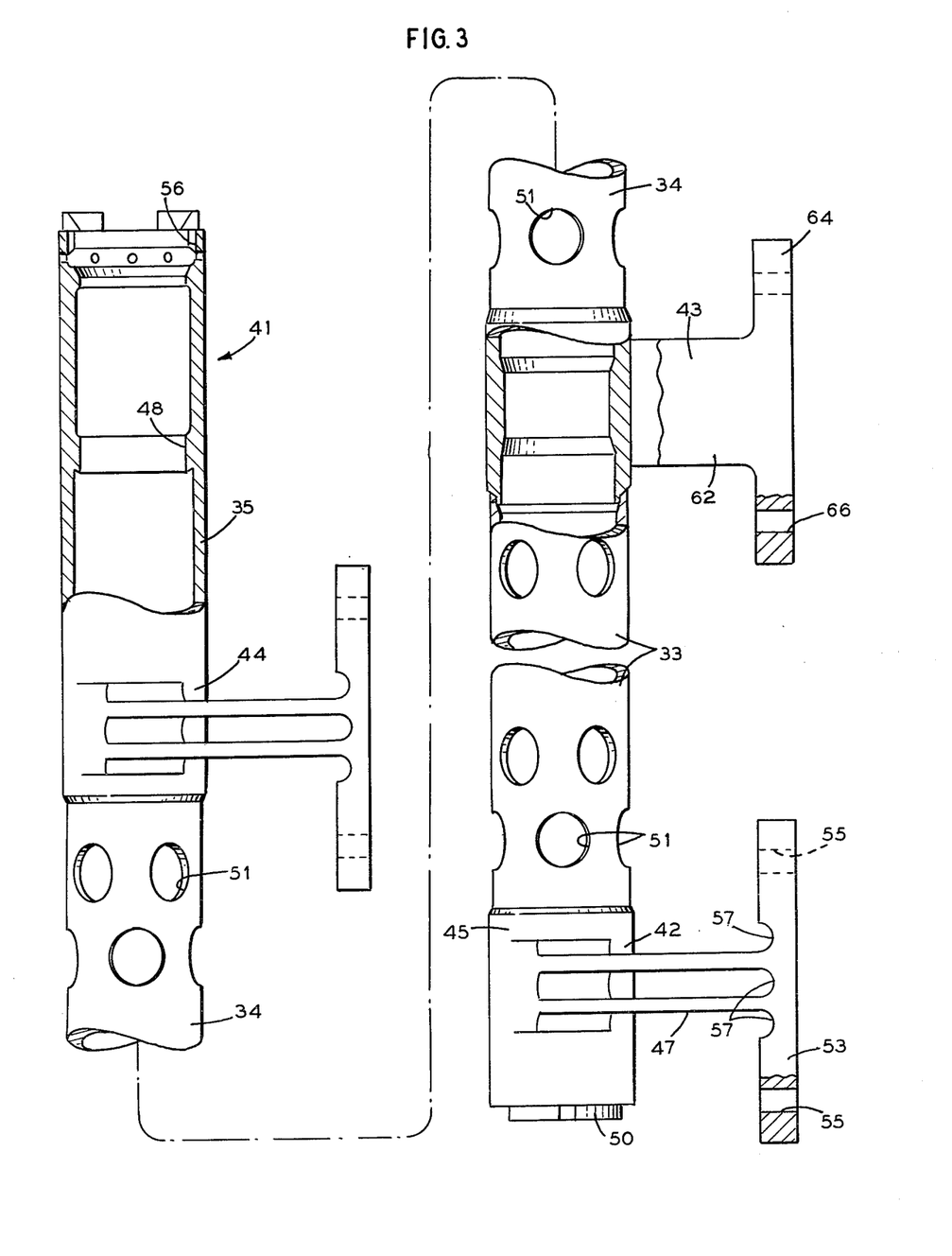
FIG. 3 is a side view, partly broken away, of the surveillance specimen holder tube of FIG. 2.

In order to monitor changes in reactor material properties, as described herein before, surveillance specimen assemblies 40 (only one of which is shown) are installed in the annulus 30 between the thermal shield 31 and the inside wall of the shell 12 at circumferentially spaced intervals. As is best shown in FIGS. 2 and 3, each specimen assembly includes a holder tube 41 which is an assembly of tubular segments and support brackets, integrally attached by welding or other means. The holder tube 41 includes lower 33, intermediate 34 and upper 35 tubular segments having circular cross sections, and a lower bracket 42, an intermediate bracket 43 and an upper bracket 44. The lower bracket 42 is integrally attached to the lower end of the holder tube 41, while the intermediate bracket 43 is integrally fixed between tubular segments 33 and 34, and the upper bracket 44 is integrally fixed between tubular segments 34 and 35. A plurality of perforations 51 are bored through the walls of the tubular segments 33 and 34 at circumferentially and longitudinally spaced intervals. The lower end of the holder assembly is essentially closed by an end plug 50 which is expansion fitted into a cylindrical portion 45 of the lower bracket. An inner circumferential ledge 48 is formed on the inside surface of upper tubular segment 35 to provide a latching surface for a closure mechanism which closes the upper end of the holder tube 41. The upper extremity of tube segment 35 is adapted at 56 to allow a transfer guide tube (not shown) to be removably coupled thereto by known means during capsule insertion and removal operations.

Figure 4:
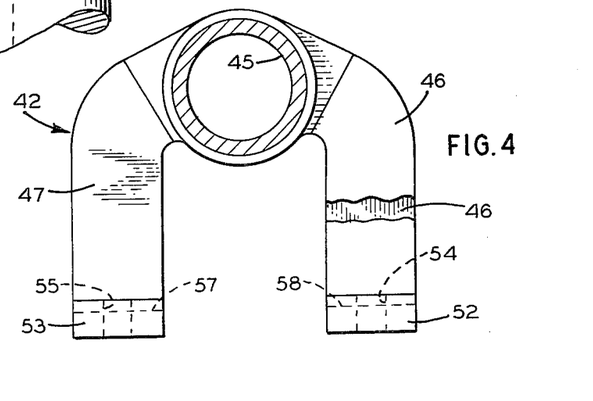
FIG. 4 is a plan view of a support bracket made in accordance with the principles of the invention.

In the preferred embodiment illustrated, the lower 42 and upper 44 brackets are identical. Hence, in the interest of clarity, only lower bracket 42 is described in detail. Referring now to FIGS. 2 and 3, and more particularly to FIG. 4, it can be seen that the bracket 42 is basically composed of a central cylindrical member 45 with two bifurcated legs 46, 47 symmetrically arching therefrom to form a U-shaped contour wherein the circular cross section of the cylindrical member 45 is orientated at the base of the U. The extremities of each of the bifurcated legs 46, 47 respectively terminate in a flange member 52, 53 disposed normal to the length of the legs and having notched recesses 57, 58 adjacent to the leg extremities. The legs 46 and 47 are bifurcated in a plane perpendicular to the length of the cylindrical member 45. In the illustrated embodiment, the flanges 52, 53 are provided with bolt holes 54, 55 respectively to facilitate attachment to a mounting surface.

Figure 5:
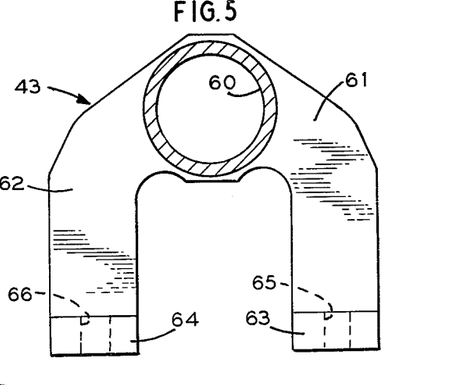
FIG. 5 is a plan view of another support bracket made in accordance with the principles of the invention.

The intermediate bracket 43, as best shown in FIG. 5, is basically composed of a central cylindircal member 60 having two legs 61, 62 symmetrically arching therefrom to form a U-shaped contour similar to that of the brackets 42, 44. The legs 61, 62 of bracket 43 are not bifurcated. Each leg 61, 62 respectively terminates in a flange member 63, 64, which are respectively provided with bolt holes 65, 66 for attaching the bracket 43 to a mounting surface. Due to differences in the cross sections of the legs of the brackets 42, 44 relative to bracket 43, and the bifurcation of the legs of the former, brackets 42 and 44 are flexible in the plane of the longitudinal axis of the holder tube 41 and bracket 43 is relatively rigid thereto. All three brackets 42, 43, 44 are radially and tangentially rigid with respect to the circular cross section of the holder tube 41.

Figure 6:
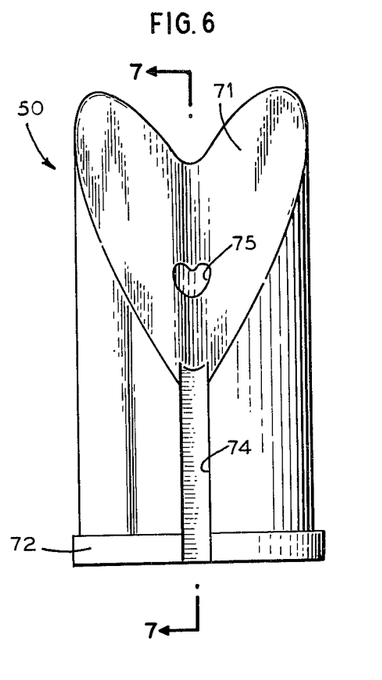
FIG. 6 is an elevation view of an end plug.
Figure 7:
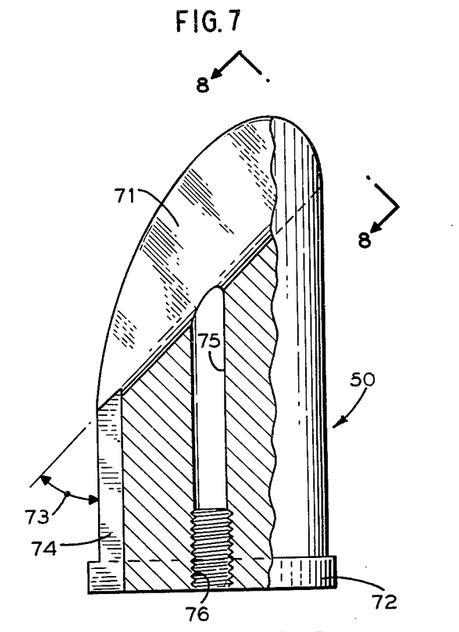
FIG. 7 is a side sectional view of the end plug of FIG. 6 taken along line 7—7.
Figure 8:
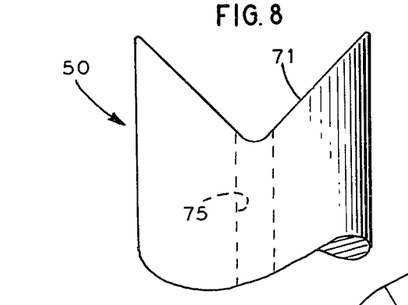
FIG. 8 is a side view of the end plug of FIG. 7 taken along line 8—8.

FIGS. 6, 7 and 8 illustrate the end plug 50 in detail. The plug 50 is essentially a solid cylinder with a V-shaped recess 71 obliquely cut into one end and with a circular flange 72 at the opposite end. The V-shaped recess 71 is cut into the plug 50 at an oblique angle 73 with respect to the longitudinal axis of the cylindrical plug. A drain slot 74 longitudinally extends along the periphery of the plug 74 and a central longitudinal bore 75 longitudinally extends through the center of the plug and is partly threaded 76 at the flanged end.

Figure 14:
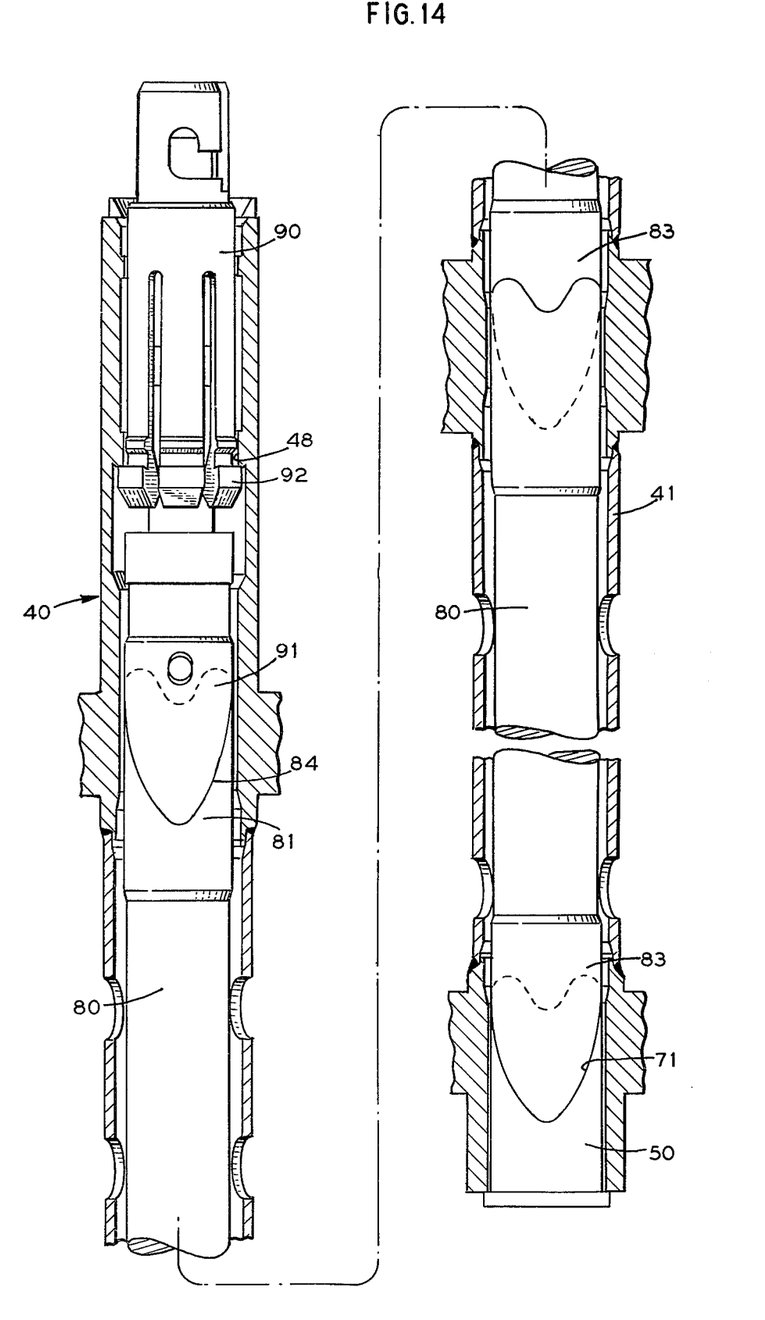
FIG. 14 is an elevation view of a specimen assembly with the holder tube illustrated in section.

A closure mechanism 90 having an oblique V-shaped projection 91 and latching means 92 is shown in FIG. 14.

Figures 9, 10, 11, 12, 13:
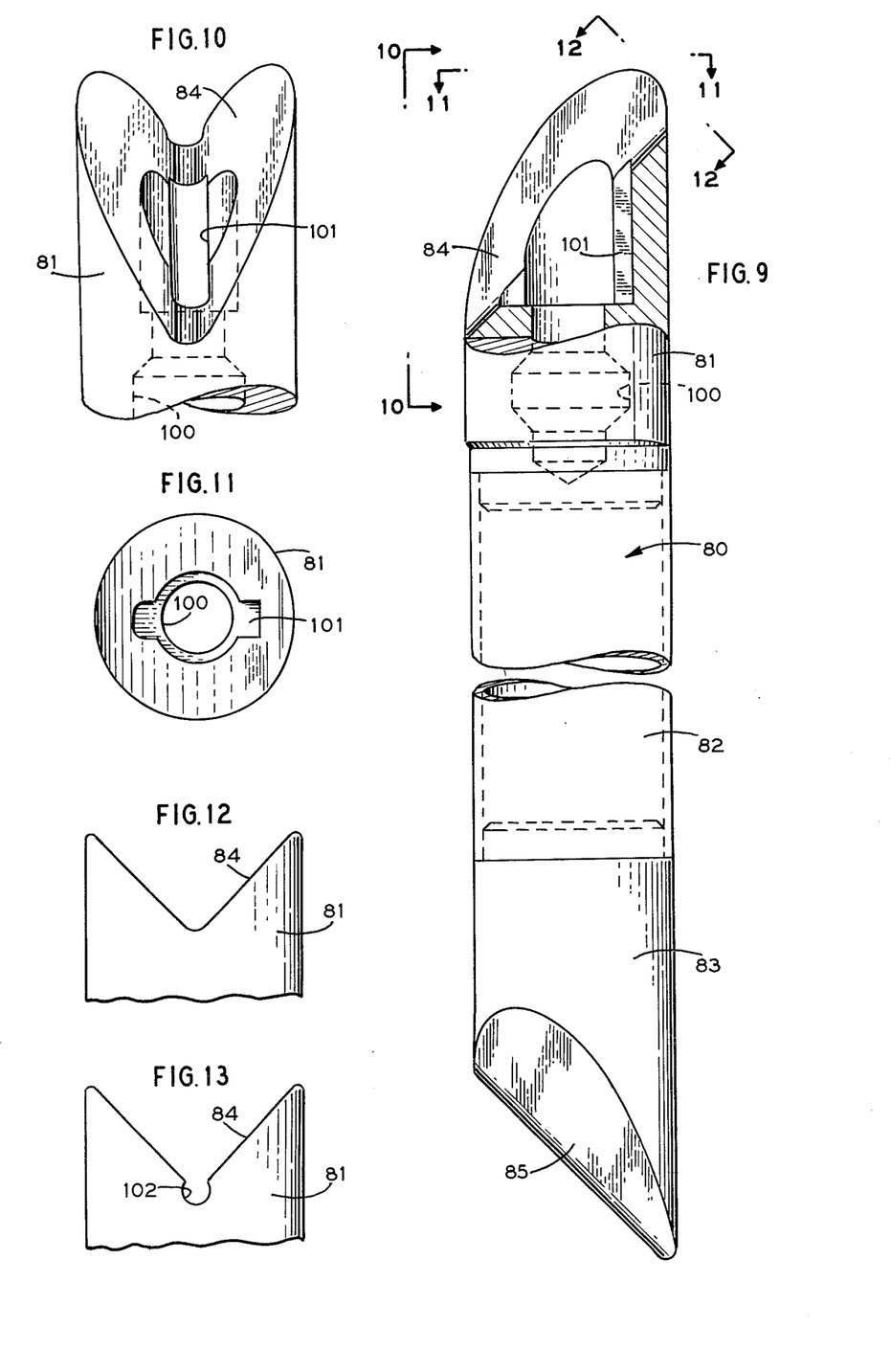
FIG. 9 is an elevation view, partly in section, of a surveillance specimen capsule made in accordance with the invention.
FIG. 10 is a side view taken along line 10—10 of a part of the capsule of FIG. 9.
FIG. 11 is a view taken along line 11—11 of FIG. 9.
FIG. 12 is a view taken along line 12—12 of FIG. 9.
FIG. 13 illustrates an alternate construction of the section of FIG. 12.

FIG. 9 illustrates a preferred embodiment of a surveillance specimen capsule 80. The specimen capsule 80 includes an elongated hollow tubular member 82 closed at its extremities by end fittings 81, 83. End fitting 81 is essentially a solid cylindrical plug sequentially stepped down in diameter at one end so it can be securely fitted into the tubular member 82. The opposite end of end fitting 81 contains a V-shaped recess 84 cut into the plug at an oblique angle with respect to the plane normal to the longitudinal axis of the capsule.

As is shown in FIG. 9, and more particularly in FIGS. 10 and 11, end fitting 81 has included a central longitudinal cavity 100 and a keyway 101 which provide means for detachably connecting a remotely operated tool (not shown) for the insertion and removal of the specimen capsule within the holder tube. The vertex of the V, as is best shown in FIG. 12, may be rounded or as shown in FIG. 13 be formed with a recess 102 to preclude a knife edge contact of mating parts, described hereinafter. End fitting 83 is also essentially a solid cylindrical plug that has one end stepped down in diameter so as to securely fit into the tubular member 82. The opposite end of the end fitting 83 is formed with a V-shaped projection 85 which traverses the diameter of the plug at an oblique angle with respect to a plane normal to the longitudinal axis of the capsule. The shape of the projection 85 of the end fitting 83 is complementary to the recessed V-shape 84 of end fitting 81, and also to the V-shape recess 71 of the end plug 50. Hence, specimen capsules 80 may be stacked end to end, as is shown in FIG. 14, so that the adjacent end fittings of adjacent capsules mesh.

In operation, as illustrated in FIG. 14, a surveillance capsule 80 is loaded into a surveillance holder tube 41 with end fitting 83 oriented at the lower end of the capsule. End fitting 83 of the first capsule inserted into the tube intermeshes with the V-shaped recess 71 of the lower end plug 50. Additional surveillance capsules are similarly loaded throughout the length of the holder tube such that the upper end fittings and lower end fittings of superjacent tubes intermesh. The latching means 92 of closure mechanism 90 connects to the holder tube 41 at ledge 48 and intermeshes via projection 91 with the recess 84 of end fitting 81 on the uppermost surveillance capsule. The closure mechanism 90 is axially loaded to place the specimen capsules 80 in compression and the holder tube 41 in tension by exerting opposite bearing pressures on the tube and capsules by a lever, screw, cam, or other type of connection with the tube wall. The closure mechanism 90 may be of the type described and claimed in the copending application Ser. No. 878,960 filed concurrently, or in the copending application Ser. No. 878,961 filed concurrently, both of which are assigned to the same assignee of this invention. The interaction of the intermeshed V-shapes of the specimen capsule and fittings with each other, the holder tube end plug and the loading mechanism results in a double acting wedge which precludes lateral movements in the directions other than along the vertex of the "V" but wedging the sides of the intermeshed components against the bracket wall at the ends of the vertex of the V.

The brackets 42, 43, 44 which support the holder tube 41 may, as is shown in FIG. 1, be connected to the thermal shield 31. It should be understood, however, that the specimen assembly disclosed herein is not limited to connection to the thermal shield of a nuclear reactor. The end support brackets 42, 44, as noted hereinbefore, are structurally stiff radially and tangentially, with respect to the circular cross section of the holder tube but are comparatively flexible in the longitudinal plane of the holder tube. The central bracket 43, which is located substantially at the tube's midsection, is structurally stiff in all directions. The orthotropic stiffness characteristic of this support arrangement is designed to provide restraint against drag, lift, and thrust loads but to accommodate thermal growth of the thermal shield without transmitting corresponding deformations to the holder tube assembly. Although three brackets are shown in the preferred embodiment, a greater number of flexible brackets could be added to support the holder tube consistent with the restraint and thermal considerations described. The brackets may be fixedly attached to the thermal shield or other parts of the reactor by means of bolts which extend through the bolt holes of the support leg flanges, by welding, or by other well known means.

In the preferred embodiment of the invention the hollow tubular members 82 of the specimen capsules 80, which actually house the reactor material specimens, are coincident with and circumscribed by a perforated tubular segment 33 or 34 of the holder tube; and, the end fittings 81, 83 are circumscribed and bear against the cylindrical members 45 or 60 of the brackets 42, 43, 44. The upper tubular segment circumscribes and houses part of the closure mechanism 90. Although the embodiment illustrated is adapted to house two specimen capsules 80, as shown in FIG. 14, it should be understood that the specimen assembly disclosed and claimed herein is not so limited.

Reactor coolant laterally flows into and exits the holder tube 41 through the perforations 51 formed in the wall of the holder tube.

The drain slot 74 of the lower end plug 50 provides means for draining reactor coolant containing radioactive contaminants upon removal of the holder tube from the reactor. The threaded connection 76 at the lower end of the end plug provides means for engagement of a handling tool.

It will be evident to those skilled in the art that changes may be made, for example, in the orientation of the capsules and in the shape of the end plug and closure mechanism, and number of specimen capsules and flexible brackets, without departing from the spirit of the invention disclosed herein or within the claimed scope of protection.

Thus, the end plug, for instance, could be formed so that it includes a V-shaped projection instead of a recess and the closure means could likewise be formed to include a V-shaped recess instead of a V-shaped projection.

The embodiments of the invention in which an exclusive property or privilege is claimed are defined as follows:

1. A surveillance specimen assembly for housing and supporting irradiation specimens within a nuclear reactor which comprises: an elongated holder tube having perforations, an end plug at one end of the holder tube, and closure means at the opposite end of the holder tube; supporting means for connecting the holder tube with the reactor; a plurality of elongated specimen capsules, each having opposite end fittings including a V-shaped recess at the extremity of one end fittings and a V-shaped projection at the extremity of the other end fitting; the specimen capsules being housed end to end within the holder tube oriented such that the end fittings of adjacent specimen capsules mesh; means for meshing the end plug with the end of the adjacent specimen capsule; means for meshing the closure means with the end of the adjacent specimen capsule; and means for axially loading the closure means so that the specimen capsules are restrained.

2. A surveillance specimen assembly as defined in claim 1, wherein the V-shaped recess and the V-shaped projection are formed at an oblique angle with respect to the plane normal to the longitudinal axis of the specimen capsule.

3. A surveillance specimen assembly as defined in claim 2, wherein the means for meshing the end plug with the end of the adjacent specimen capsule includes a V-shaped recess formed in the end plug, and the means for meshing the closure means with the end of the adjacent specimen capsule includes a V-shaped projection in the closure means.

4. A surveillance specimen assembly as defined in claim 2, wherein the means for meshing the end plug with the end of the adjacent specimen capsule includes a V-shaped projection formed in the end plug, and the means for meshing the closure means with the end of the adjacent specimen capsule includes a V-shaped recess in the closure means.

5. A surveillance specimen assembly as defined in claim 1, wherein the supporting means for connecting the holder tube with the reactor includes a rigid bracket and at least one bracket axially flexible with respect to longitudinal plane of the holder tube.

6. A surveillance specimen assembly as defined in claim 5, wherein the axially rigid bracket is centrally connected to the elongated holder tube.

7. A surveillance specimen assembly as defined in claim 1, wherein the perforations of the elongated holder tube are located at circumferentially and longitudinally spaced intervals.

* * * * *